(12) United States Patent
Yu

(10) Patent No.: US 6,722,921 B1
(45) Date of Patent: Apr. 20, 2004

(54) ELECTRICAL CARD CONNECTOR

(75) Inventor: Hung-Chi Yu, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/329,066

(22) Filed: Dec. 23, 2002

(30) Foreign Application Priority Data

Dec. 10, 2002 (TW) ............................................. 91220008

(51) Int. Cl.[7] .............................................. H01R 13/73
(52) U.S. Cl. ...................................... 439/573; 439/607
(58) Field of Search ................................ 439/573, 564, 439/92, 607

(56) References Cited

U.S. PATENT DOCUMENTS

| | | | | |
|---|---|---|---|---|
| 5,685,738 A | * | 11/1997 | Harting et al. | ............... 439/573 |
| 6,019,633 A | * | 2/2000 | Tung et al. | ................. 439/573 |
| 6,048,214 A | * | 4/2000 | Hirata et al. | |
| 6,059,586 A | * | 5/2000 | Watanabe et al. | |
| 6,231,382 B1 | * | 5/2001 | Yu | |
| 6,319,026 B1 | * | 11/2001 | Chen et al. | ................. 439/573 |
| 6,371,803 B1 | * | 4/2002 | Fan | .............................. 439/573 |
| 6,461,175 B2 | * | 10/2002 | Okamoto | ...................... 439/92 |
| 6,478,617 B2 | * | 11/2002 | Fan | .............................. 439/573 |

* cited by examiner

*Primary Examiner*—Gary Paumen
(74) *Attorney, Agent, or Firm*—Wei Te Chung

(57) ABSTRACT

An electrical card connector (1) mounted on a printed circuit board (2) via a bolt (3) includes an insulating body (10) in which a number of terminals (11) are provided for electrical connection to the printed circuit board, a shield (12) covering the insulating body and a pair of stand-off devices (14) attached on opposite sides of the shield. Each stand-off device includes a retention portion (140) secured to the shield, a terminal portion (141) with a screw hole (1412) defined therein extending laterally from a lower edge of the retention portion for connection to the printed circuit board and a shield member (142) upwardly extending from edges of the terminal portion to form a shield space (147) for shielding the bolt which engages with the screw hole of the terminal portion.

2 Claims, 6 Drawing Sheets

ELECTRICAL CARD CONNECTOR

BACKGROUND OF THE INVENTION

1. Field of the Invention

The present invention relates to an electrical card connector having a stand-off device, and particularly to an electrical card connector which can shield a fastener, which is employed to mount the stand-off device to a printed circuit board, from interfering other electronic devices. This application relates to the contemporaneously filed two other applications having the same title, the same inventor and the same assignee with the invention.

2. Description of Related Art

Electrical card connectors, such as PCMCIA (Personal Computer Memory Card International Association) card connectors, are widely used in computer industry for electrically connecting with inserted electronic cards which function as removable mass storage devices. To meet the trend of miniaturization and high-speed data transmission of computer technology, the electrical card connectors are developed to have a compact and high-density arrangement regarding contacts of the electrical card connectors, which may result in EMI (Electromagnetic Interference) and ESD (Electro-static Discharge) problems, thereby adversely affecting electrical performance of the electrical card connectors.

In order to achieve better electrical performance, the electrical card connectors are equipped with grounding devices to ground the inserted electronic cards to a ground circuit of a printed circuit board on which the connectors are mounted. At the same time, the electrical card connectors often have stand-off devices for providing clearance between the connectors and the printed circuit board to thereby allowing components such as semiconductors to be mounted on the printed circuit board below the card connectors. Generally, the stand-off devices of the electrical card connectors also have grounding function. Thus, no additional grounding devices are required for the electrical card connectors. Examples of these conventional electrical card connectors are disclosed in U.S. Pat. Nos. 6,019,633, 6,231,382, 6,059,586 and 6,048,214.

Referring to FIGS. 5 and 6, a conventional electrical card connector 4 and a printed circuit board 5 on which the connector 4 is mounted are shown. The electrical connector 4 comprises an insulating body 40 in which a plurality of terminals 41 are provided for electrical connection to the printed circuit board 5, a shield 42 covering the insulating body 40 and a pair of stand-off devices 44 (only one is shown) attached to the shield 42 on opposite sides thereof. Each stand-off device 44 is generally of an L-shaped configuration including a retention portion 440 and a terminal portion 441 extending perpendicularly from a lower edge of the retention portion 440. The retention portion 440 defines a first and a second slits (not labeled) for fitly receiving therein a first spring tab 422 and a second spring tab 424 of the shield 42, respectively, whereby the stand-off device 44 is securely attached to the shield 42. The terminal portion 441 has a projection 442 defining a screw hole (not labeled) therein. A bolt 6 is employed to upwardly extend through a positioning hole 50 of the printed circuit board 5 and then into the screw hole of the stand-off device 44, thereby fixing the connector 4 on the printed circuit board 5. It is noted that the terminal portion 441 is also connected to a ground circuit of the printed circuit board 5 for grounding purpose.

The bolt 6 generally has a large lengthwise dimension for fixing the electrical card connector 4 to the printed circuit boards having various thickness. When the printed circuit board 5 is thinner, a tail portion 61 of the bolt 6 extends beyond the projection 442 and is mostly exposed above the printed circuit board 5. The exposed tail portion 61 of the bolt 6 has a risk of interfering other electronic devices, whereby a connection is easy to become loose between the connector 4 and the printed circuit board 5, which results in an unreliable electrical connection between the connector 4 and the printed circuit board 5. At the same time, the exposed tail portion 61 of the bolt 6 may scratch or even damage the electronic devices, thereby increasing the manufacturing cost.

Hence, an improved electrical card connector is required to overcome the disadvantages of the related art.

SUMMARY OF THE INVENTION

Accordingly, it is an object of the present invention to provide an electrical card connector having a stand-off device, the connector being configured to prevent a fastener, which is employed to mount the stand-off device to a printed circuit board, from interfering other electronic devices.

In order to achieve the object set forth, an electrical card connector in accordance with the present invention comprises an insulating body in which a plurality of terminals are provided for electrical connection to a printed circuit board, a shield covering the insulating body and a pair of stand-off devices attached on opposite sides of the shield. Each stand-off device includes a retention portion secured to the shield, a terminal portion with a hole defined therein extending laterally from a lower edge of the retention portion for connection to the printed circuit board and a shield member upwardly extending from edges of the terminal portion to form a shield space for shielding a bolt which engages with the hole terminal portion.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
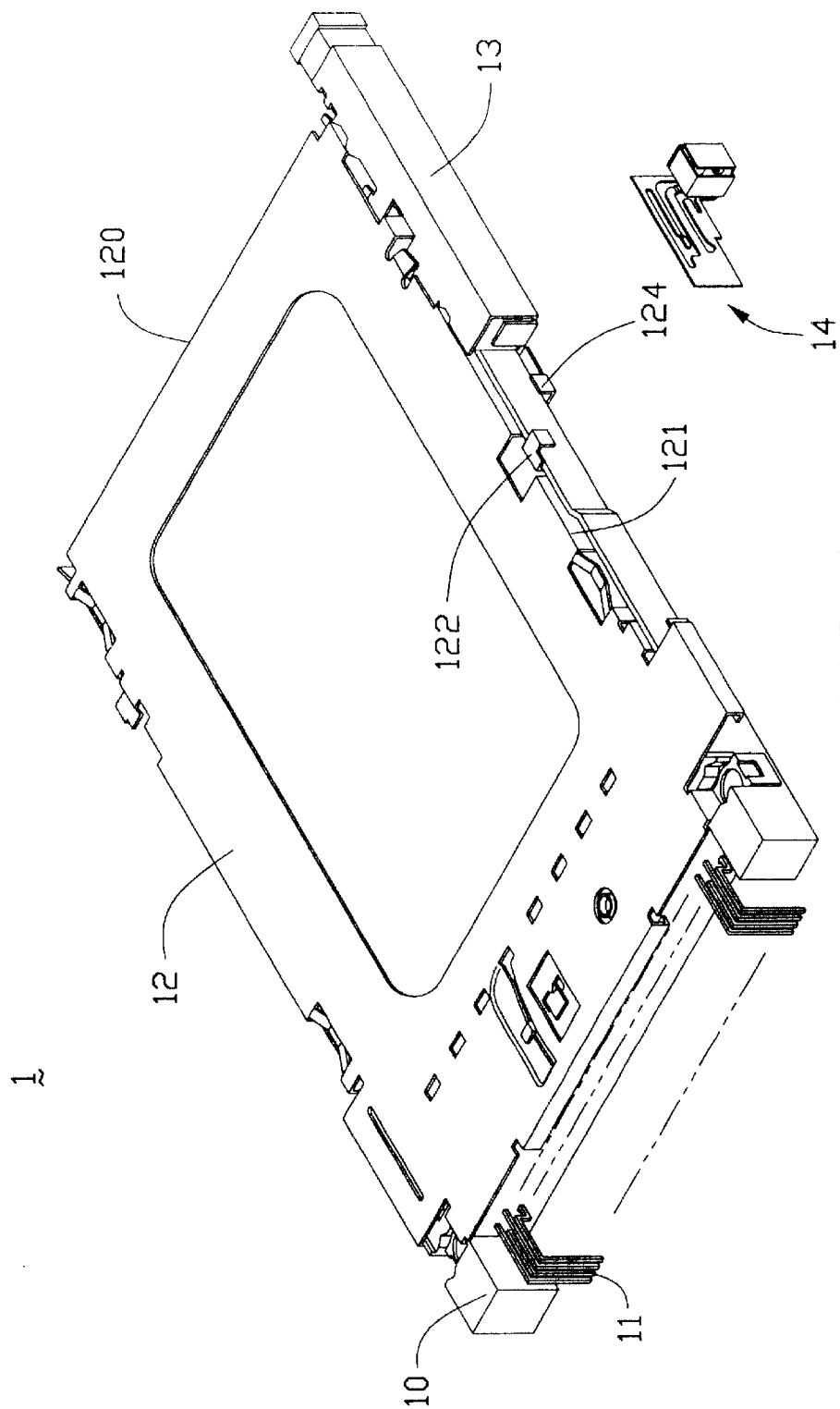
FIG. 1 is a perspective view of an electrical card connector with a stand-off device unassembled thereto in accordance with the present invention.
Figure 2:
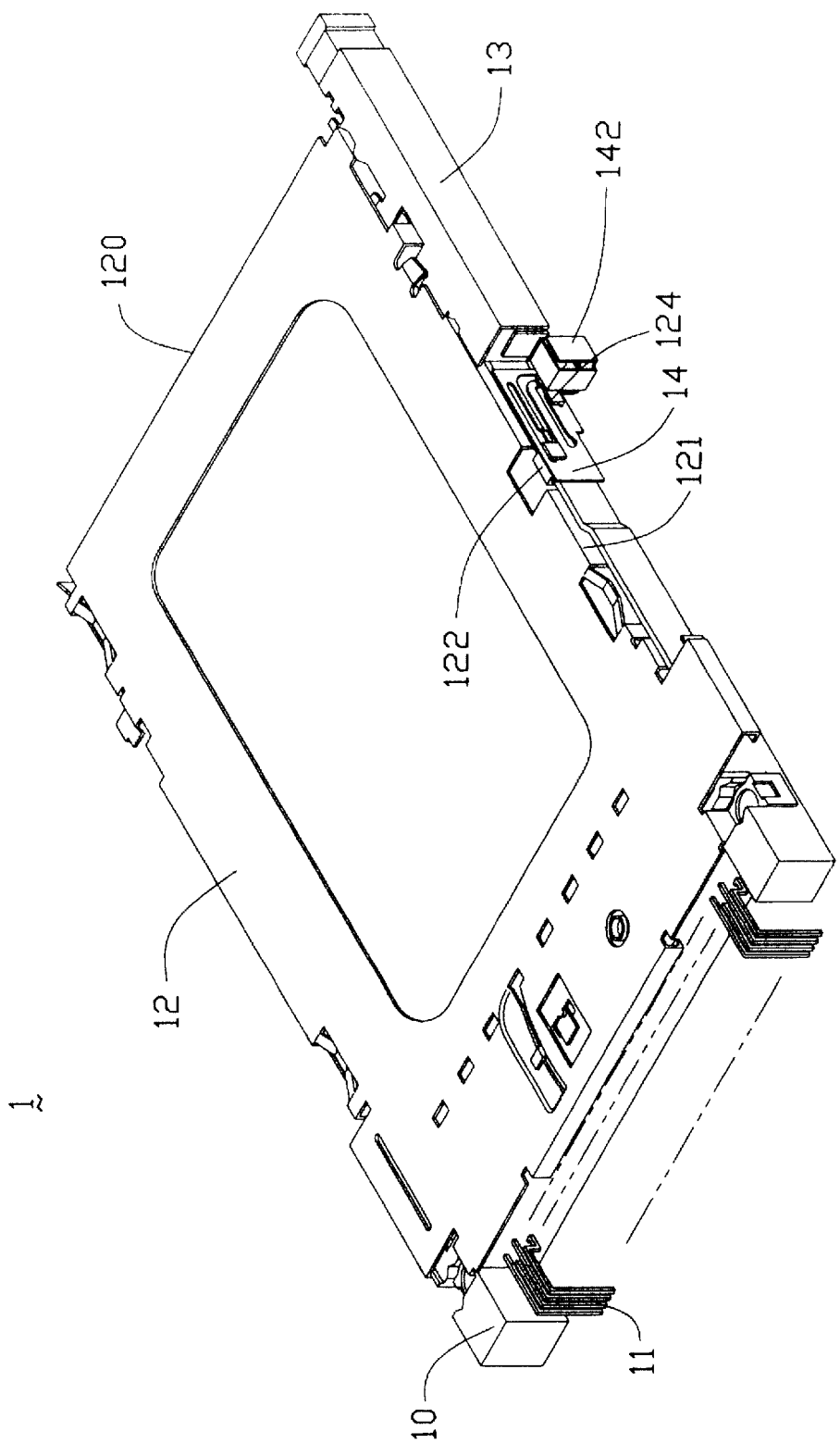
FIG. 2 is a view similar to FIG. 1 but showing the electrical card connector with the stand-off device assembled thereto.

Referring to FIGS. 1 and 2, an electrical card connector 1 in accordance with the present invention comprises an insulating body 10 in which a plurality of terminals 11 are provided for electrical connection with an electronic card (not shown) and a printed circuit board 2 (FIG. 4), a shield 12 covering the insulating body 10, an ejector 13 attached to one side of the shield 12 for ejecting the inserted electronic card therefrom and a pair of stand-off devices 14 (only one is shown) secured on opposite sides of the shield 12. The shield 12 includes a plate 120 and a pair of side walls 121 extending downwardly perpendicularly from opposite ends of the plate 120 to form a receiving space (not shown) therebetween for receiving the electronic card therein. Each side wall 121 of the shield 12 forms a first and a second spring tabs 122, 124 therein.

Figure 3:
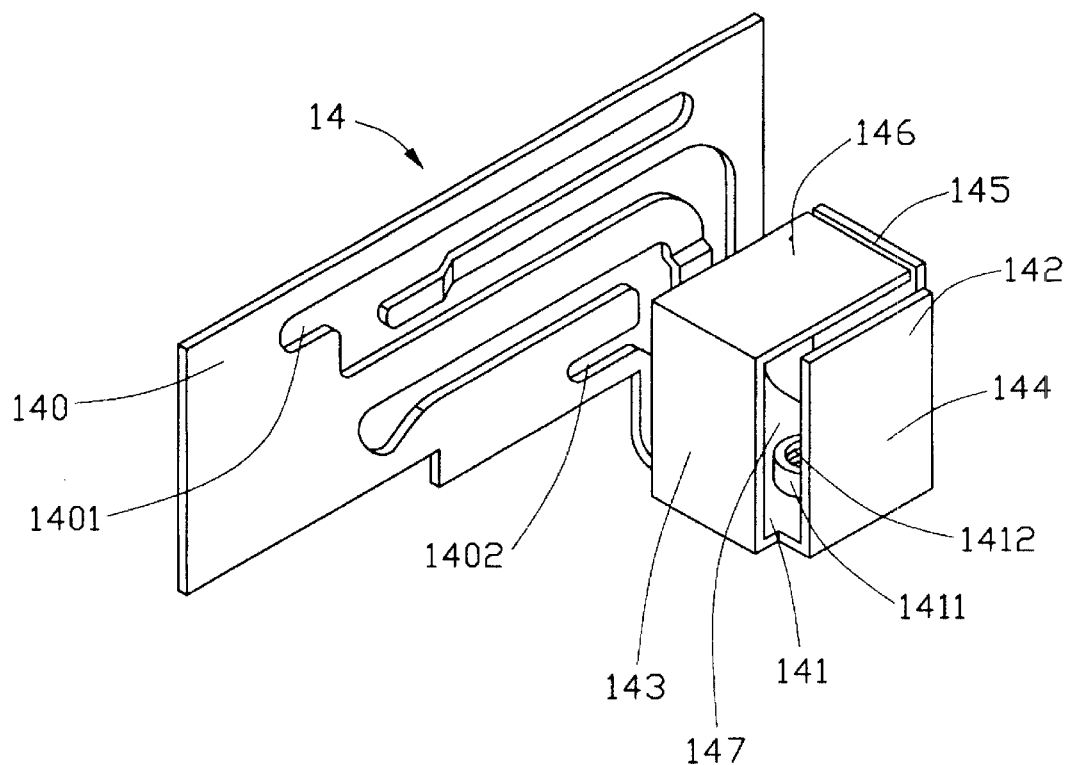
FIG. 3 is an enlarged perspective view of the stand-off device of FIG. 1.
Figure 4:
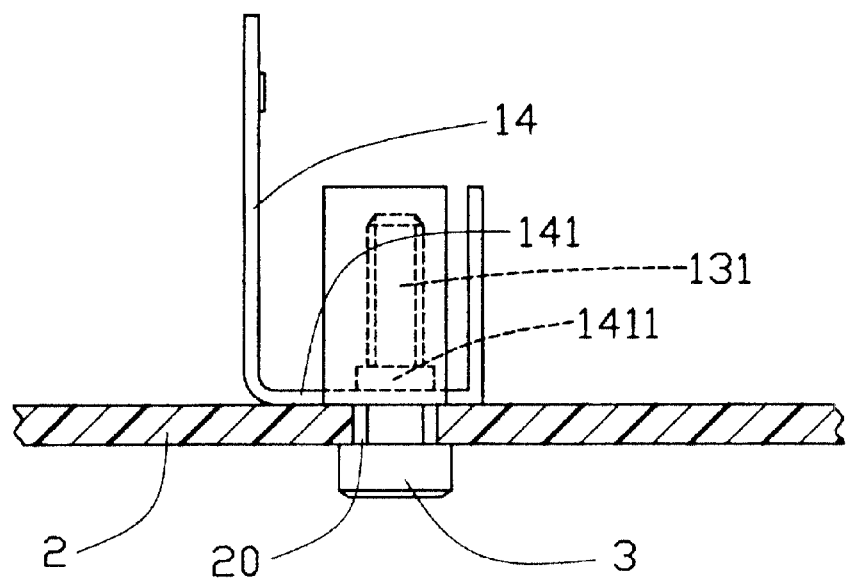
FIG. 4 is a plan view schematically showing the stand-off device of the eiectrical card connector mounted on a printed circuit board.
Figure 5:
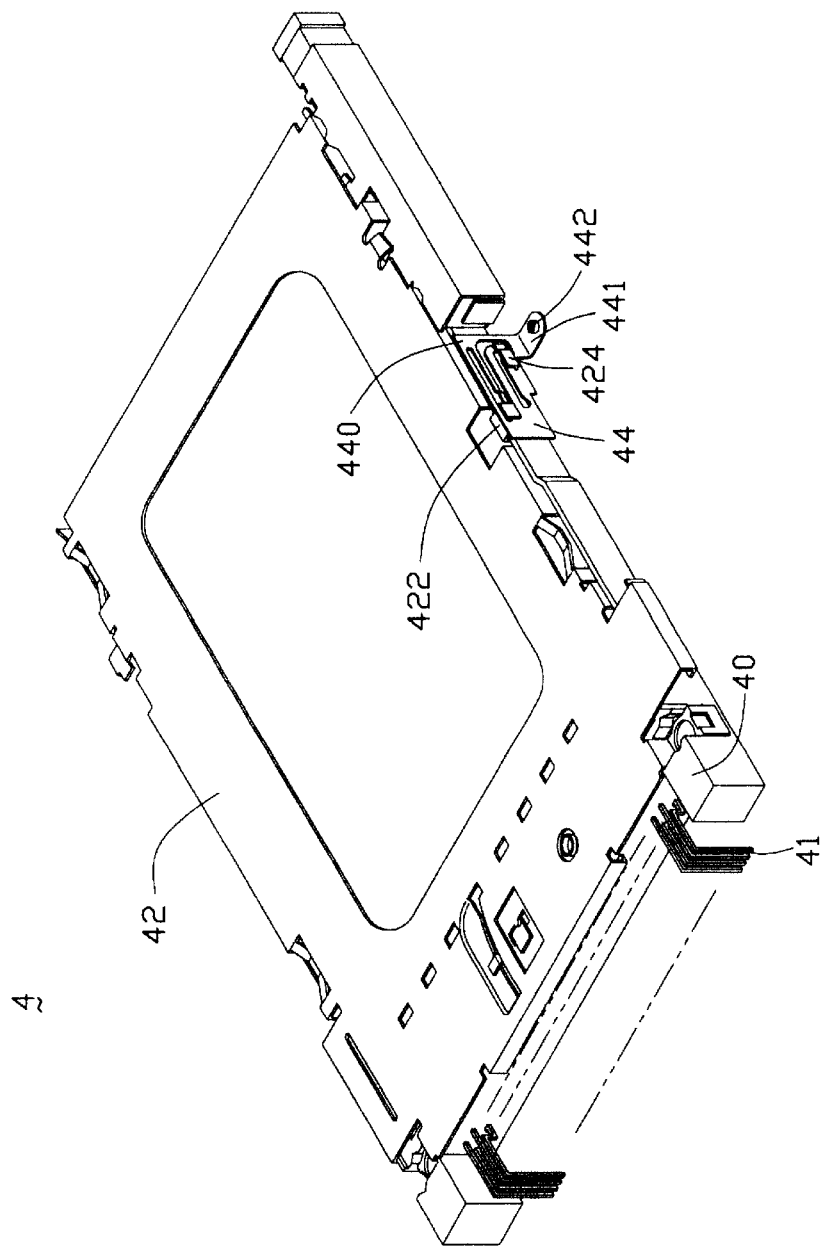
FIG. 5 is a perspective view of a conventional electrical card connector with a stand-off device assembled thereto.
Figure 6:
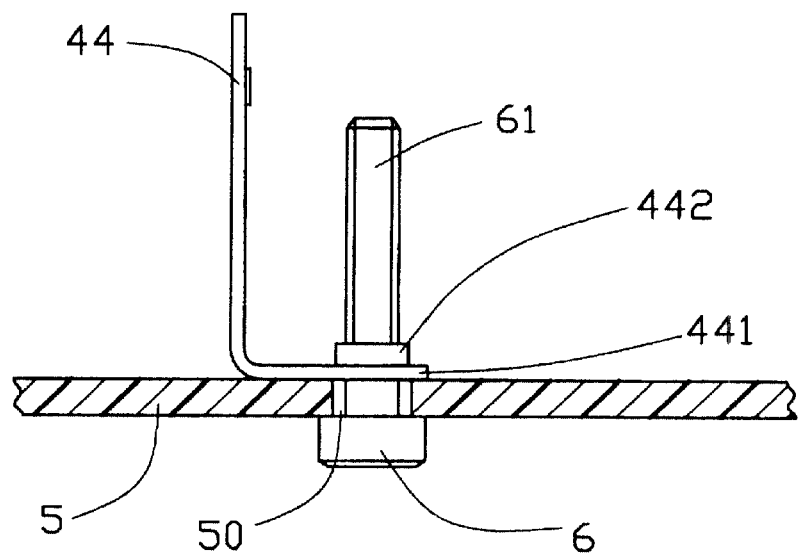
FIG. 6 is a plan view schematically showing the stand-off device of FIG. 5 mounted on a printed circuit board.

Referring to FIG. 3, the stand-off device 14 includes a retention portion 140 secured to the shield 12, a terminal portion 141 extending perpendicularly from a lower edge of the retention portion 140 for connection to the printed circuit board 2 and a shield member 142 upwardly extending from the terminal portion 141. The retention portion 140 defines a first and a second lock holes 1401, 1402 respectively for receiving and retaining the first and the second spring tabs 122, 124 therein, thereby securing the stand-off devices 14 on the side walls 121 of the shield 12. The terminal portion 141 has a projection 1411 with a screw hole 1412 defined therein for engaging with a bolt 3 (FIG. 4). The shield member 142 has vertical blades 143, 144, 145 upwardly perpendicularly extending from free edges of the terminal portion 141 around the projection 1411 and a horizontal blade 146 integrally extending from a top edge of the vertical blade 143. A shield space 147 is thus formed by the vertical blades 143, 144, 145, the horizontal blade 146 and the retention portion 140.

Referring to FIG. 4 in conjunction with FIG. 3, the printed circuit board 2 defines a positioning hole 20 corresponding to the screw hole 1412 of the stand-off device 14. When the electrical card connector 1 is mounted on the printed circuit board 2, the screw hole 1412 is aligned with the positioning hole 20 and the bolt 3 upwardly extends through the positioning hole 20 from a bottom of the printed circuit board 2 and then engages with the screw hole 1412 of the stand-off deviced 14. A tail portion 31 of the bolt 3 extends beyond the projection 1411 to be wholly received in the shield space 147, thereby preventing the tail portion 31 of the bolt 3 from interfering other electronic devices to ensure reliable working of the eiectrical card connector i and other electronic devices.

It is to be understood, however, that even though numerous characteristics and advantages of the present invention have been set forth in the forgoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector mounted on a printed circuit board via a bolt for receiving an electronic card therein, comprising:
   an insulating body in which a plurality of terminals are provided for electrical connection to the printed circuit board;
   a metal shield covering the insulating body; and
   a metal stand-off device including a retention portion secured to the shield, a terminal portion with a hole defined therein extending laterally from a lower edge of the retention portion for connection to the printed circuit board and a shield member extending upwardly from edges of the terminal portion to form a shield space for shielding the bolt which engages with the hole of the terminal portions;
   wherein the shield member includes vertical blades extending upwardly perpendicularly from the edges of the terminal portion and a horizontal blade extending perpendicularly from a top edge of one of the vertical blades;
   wherein the terminal portion has a projection extending toward the horizontal blade, and the hole is defined in the projection;
   wherein the hole is a screw hole;
   wherein the shield defines a spring tab, and the retention portion of the stand-off device defines a lock hole for receiving and retaining the spring tab therein;
   wherein the terminal portion has a projection with the hole defined therein.

2. An electrical connector assembly comprising:
   a printed circuit board defining opposite upper and bottom surfaces with a through hole extending therethrough;
   an electrical connector mounted upon the upper surface of the printed circuit board, said connector including an insulative housing assembly with a plurality of contacts therein;
   a metal shield assembly enclosing at least partially the housing assembly;
   a metal standoff secured to at least one of said housing assembly and said shield assembly, said standoff including a mounting plate seated upon the upper surface of the printed circuit board with therein a screw hole substantially located outside of an outer contour of said connector while in alignment with said through hole; and
   a screw extending upwardly from the bottom surface of said printed circuit board through both the through hole and the screw hole with a head section of said screw located on the bottom surface of the mother board and with a portion of said screw located above the mounting plate; wherein said connector is equipped with a cover device essentially fully shielding said portion of the screw in horizontal directions;
   wherein said shield assembly defines two sides of the connector;
   wherein said standoff is secured to the shielding assembly;
   wherein said shield assembly is further equipped with an ejection mechanism;
   wherein said cover device is provided by the standoff;
   wherein said cover device further shields the portion of the screw vertically;
   wherein said cover device is of a box-like configuration.

\* \* \* \* \*